United States Patent
Tamura et al.

(10) Patent No.: US 10,691,034 B2
(45) Date of Patent: Jun. 23, 2020

(54) POLYESTER RESIN FOR TONER, METHOD FOR PRODUCING SAME, AND TONER

(71) Applicant: Mitsubishi Chemical Corporation, Chiyoda-ku (JP)

(72) Inventors: Yoko Tamura, Tokyo (JP); Tadahiro Ozawa, Tokyo (JP); Akifumi Kondo, Tokyo (JP); Takahiro Mori, Tokyo (JP)

(73) Assignee: Mitsubishi Chemical Corporation, Chiyoda-ku (JP)

( * ) Notice: Subject to any disclaimer, the term of this patent is extended or adjusted under 35 U.S.C. 154(b) by 0 days.

(21) Appl. No.: 16/426,491

(22) Filed: May 30, 2019

(65) Prior Publication Data

US 2019/0278193 A1    Sep. 12, 2019

Related U.S. Application Data

(63) Continuation of application No. PCT/JP2017/009316, filed on Mar. 8, 2017.

(30) Foreign Application Priority Data

Dec. 7, 2016    (JP) ................. 2016-237581

(51) Int. Cl.
| | |
|---|---|
| *G03G 9/08* | (2006.01) |
| *G03G 9/087* | (2006.01) |
| *C08G 63/183* | (2006.01) |
| *C08G 63/195* | (2006.01) |
| *C08G 63/42* | (2006.01) |
| *C08G 63/668* | (2006.01) |
| *C08G 63/672* | (2006.01) |

(52) U.S. Cl.
CPC ........ *G03G 9/08755* (2013.01); *C08G 63/183* (2013.01); *C08G 63/195* (2013.01); *C08G 63/42* (2013.01); *C08G 63/668* (2013.01); *C08G 63/672* (2013.01)

(58) Field of Classification Search
CPC .......................... G03G 9/08755; C08G 63/182
USPC ...................................................... 430/109.4
See application file for complete search history.

(56) References Cited

U.S. PATENT DOCUMENTS

| | | |
|---|---|---|
| 2007/0099106 A1 | 5/2007 | Ueda et al. |
| 2013/0041125 A1 | 2/2013 | Hishida et al. |
| 2013/0202997 A1 | 8/2013 | Iwagoe et al. |
| 2015/0004541 A1 | 1/2015 | Takahashi et al. |
| 2015/0192871 A1 | 7/2015 | Iwagoe et al. |
| 2015/0247000 A1 | 9/2015 | Moriyama et al. |
| 2018/0067412 A1 | 3/2018 | Ozawa et al. |

FOREIGN PATENT DOCUMENTS

| | | |
|---|---|---|
| EP | 2 626 744 A1 | 8/2013 |
| EP | 2 818 933 A1 | 12/2014 |
| JP | 3-97727 | 4/1991 |
| JP | 6-56973 | 3/1994 |
| JP | 6-263854 | 9/1994 |
| JP | 2000-305315 | 11/2000 |
| JP | 2005-275390 A | 10/2005 |
| JP | 2006-18032 | 1/2006 |
| JP | 2007-127684 | 5/2007 |
| JP | 2007-133391 | 5/2007 |
| JP | 2008-40286 | 2/2008 |
| JP | 2008-158502 | 7/2008 |
| JP | 2010-204318 A | 9/2010 |
| JP | 2015-10199 | 1/2015 |
| JP | 2017-48389 | 3/2017 |
| JP | 2017-57333 | 3/2017 |
| WO | WO 2011/132318 A1 | 10/2011 |
| WO | WO 2011/132319 A1 | 10/2011 |
| WO | WO 2014/042193 A1 | 3/2014 |
| WO | WO 2016/186028 A1 | 11/2016 |

OTHER PUBLICATIONS

International Search Report dated Jun. 6, 2017 in PCT/JP2017/009316 filed Mar. 8, 2017 (with English Translation).
Extended European Search Report dated Sep. 4, 2019 in European Patent Application No. 17877977.3, 8 pages.
Office Action issued Apr. 16, 2020, in European patent application No. 17 877 977.3 ( 6 pages).

*Primary Examiner* — Mark A Chapman
(74) *Attorney, Agent, or Firm* — Oblon, McClelland, Maier & Neustadt, L.L.P.

(57) ABSTRACT

There are provided a polyester resin for toner which has a sufficiently low TVOC, can be produced with high productivity, and can produce toner having excellent durability; and toner containing the polyester resin for toner. The polyester resin for toner has a TVOC of 380 ppm or less and includes a component derived from ethylene glycol, a hydrocarbon group having 12 carbon atoms or more, and a titanium element.

12 Claims, No Drawings

POLYESTER RESIN FOR TONER, METHOD FOR PRODUCING SAME, AND TONER

This application is a continuation application of International Application No. PCT/JP2017/009316, filed on Mar. 8, 2017, which claims the benefit of priority of the prior Japanese Patent Application No. 2016-237581, filed in Japan on Dec. 7, 2016, the content of which is incorporated herein by reference.

TECHNICAL FIELD

The present invention relates to a polyester resin for toner, a method for producing the same, and toner.

BACKGROUND ART

In a method for obtaining an image through an electrophotographic printing method or an electrostatic charge development method, an electrostatic charge image formed on a photoreceptor is usually developed using toner which has been previously charged by friction, and is then fixed.

When the toner is heated during the fixing or the like, in some cases, a volatile organic compound (VOC) may be generated. There is a concern that the generation of VOC may affect the environment or the like. For this reason, in recent years, in view of health and environmental protection, reduction of the total amount of VOC (Total Volatile Organic Compound: TVOC) is required, and the reduction of TVOC (low TVOC) is required also for the resin for toner.

As a method for reducing TVOC of a binder resin, a method for prolonging decompression reaction time during production of the binder resin and removing residual monomers of the binder resin (PTL 1), and a method for adjusting the amount of a volatile component (aliphatic diol component) caused by a polyester resin (PTL 2) are proposed.

On the other hand, the polyester resin for toner generally uses a bisphenol A derivative as a composition. The bisphenol A derivative is a component that is difficult to volatize. Thus, containing a large quantity of bisphenol A derivatives is advantageous from the viewpoint of TVOC reduction, but is disadvantageous because of the influence of bisphenol A on the environmental aspect and the lowering of the resin productivity due to the poor reactivity. As an example of the polyester for toner which includes a small quantity of bisphenol A derivative components, PTL 3 is mentioned.

Furthermore, the polyester resin tends to have a low non-offset property because the polyester resin has poor peelability at the time of the fixing. Generally, a release component such as a wax is blended in the toner in order to impart peelability at the time of the fixing. However, since the polyester resin and the wax have poor compatibility, the dispersion state of the wax component is uneven. Thus, the wax rich portion and the wax poor portion are generated in the toner, and there are various problems.

PTL 4 discloses a technique of providing toner which has favorable fixing performance, non-offset property, image stability, and durability and has excellent color development and color reproducibility so as to be usable for color use, by using a polyester resin that has a high light transmittance and is polymerized in the presence of a long chain alkyl group having a specific functional group at the end. Furthermore, PTL 5 discloses a technique of providing toner which has favorable fixing performance, non-offset property, image stability, and durability, by using a binder resin composition for toner which contains a polyester resin having a constitutional unit derived from oxidized polyolefin and the oxidized polyolefin. Additionally, PTL 6 discloses a technique of providing toner which is excellent in both hot-offset resistance and electrification, by using polyester for toner obtained by performing a polycondensation reaction in the presence of the wax having a polar group.

CITATION LIST

Patent Literature

[PTL 1] Japanese Unexamined Patent Application, First Publication No. 2008-40286
[PTL 2] Japanese Unexamined Patent Application, First Publication No. 2000-305315
[PTL 3] Japanese Unexamined Patent Application, First Publication No. 2007-127684
[PTL 4] Japanese Unexamined Patent Application, First Publication No. 2007-133391
[PTL 5] Japanese Unexamined Patent Application, First Publication No. 2008-15850.
[PTL 6] Japanese Unexamined Patent Application, First Publication No. 2006-18032

SUMMARY OF INVENTION

Technical Problem

However, the method disclosed in PTL 1 is inferior in productivity.

As disclosed in PTL 2, there is a limit in reducing TVOC of the polyester resin with the method for adjusting the amount of the aliphatic diol component. Furthermore, PTLs 3, 4, 5, and 6 have no description relating to TVOC.

The present invention is made in view of the above circumstances, and the object of the present invention is to provide a polyester resin for toner which has sufficiently reduced TVOC and has high productivity, and in which safety is also taken into consideration, and toner which contains the polyester resin for toner and has favorable fixing performance, non-offset property, image stability, and durability.

Solution to Problem

The present invention has the following aspects.

[1] A method for producing a polyester resin for toner, the method including: polycondensing a monomer mixture including polyhydric alcohol which includes an alkylene oxide adduct of bisphenol A and ethylene glycol, and polyvalent carboxylic acid in the presence of a compound A, in which polyvalent carboxylic acid and the compound A have any one of a functional group which reacts with an acid, a functional group which reacts with an alcohol, and an ester group, and a hydrocarbon group having 12 carbon atoms or more, and the amount of polyhydric alcohol to be used is set such that the number of hydroxyl groups in a monomer is 1.20 or less when the number of carboxyl groups in the monomer is 1.

[2] The method for producing a polyester resin for toner described in [1], in which the amount of the compound A is 0.1 mass % or more and less than 3 mass % in total raw materials.

[3] The method for producing a polyester resin for toner described in [1] or [2], in which a polycondensation reaction is performed in the presence of a titanium-based catalyst with the alkylene oxide of bisphenol A being 45 parts by moles or less with respect to 100 parts by moles of an acid component.

[4] The method for producing a polyester resin for toner described in [1] or [2], in which, with respect to 100 parts by moles of an acid component, the alkylene oxide adduct of bisphenol A is 30 parts by moles or less, and terephthalic acid is 70 parts by moles or less.

[5] The method for producing a polyester resin for toner described in [1] or [2], in which a ratio of the number of hydroxyl groups derived from an alcohol component to the number of carboxyl groups derived from an acid component (hydroxyl group/carboxyl group) is 1.09 or less, and the alkylene oxide of bisphenol A is 45 parts by moles or less with respect to 100 parts by moles of the acid component.

[6] A polyester resin for toner, obtained by reacting a mixture of: a monomer including an acid component and an alcohol component which is 90 parts by moles or more and 150 parts by moles or less with respect to 100 parts by moles of the acid component; and a compound A, in which the compound A has any one of a functional group which reacts with an acid, a functional group which reacts with an alcohol, and an ester group, and a hydrocarbon group having 12 carbon atoms or more, an alkylene oxide adduct of bisphenol A and ethylene glycol are included as the alcohol component, and the total amount of a volatile organic compound (TVOC) is 380 ppm or less.

[7] The polyester resin for toner described in [6], in which the compound A is 0.1 mass % or more and less than 3 mass % in the mixture.

[8] The polyester resin for toner described in [6] or [7], in which the polyester resin for toner is a product obtained from a reaction in the presence of a titanium-based catalyst, and a constitutional unit derived from the alkylene oxide adduct of bisphenol A is 45 parts by moles or less with respect to 100 parts by moles of the acid component.

[9] The polyester resin for toner described in [6] or [7], in which, with respect to 100 parts by moles of the acid component, a constitutional unit derived from the alkylene oxide adduct of bisphenol A is 30 parts by moles or less, and a constitutional unit derived from terephthalic acid is 70 parts by moles or less.

[10] The polyester resin for toner described in [6] or [7], in which the polyester resin for toner is a polycondensate of a monomer mixture in which a ratio of the number of hydroxyl groups derived from the alcohol component to the number of carboxyl groups derived from the acid component (hydroxyl group/carboxyl group) is 1.09 or less, and a constitutional unit derived from the alkylene oxide adduct of bisphenol A is 45 parts by moles or less with respect to 100 parts by moles of the acid component.

[11] Toner containing the polyester resin for toner described in any one of [6] to [10].

Advantageous Effects of Invention

According to the present invention, there are provided a polyester resin for toner which has sufficiently reduced TVOC and has high productivity, and in which an environmental aspect is taken into consideration, and toner which contains the polyester resin for toner and has favorable fixing performance, non-offset property, image stability, and durability.

DESCRIPTION OF EMBODIMENTS

<Polyester Resin for Toner>

The polyester resin for toner according to the present invention (hereinafter, also simply referred to as "polyester resin") contains a component derived from ethylene glycol, a component derived from a hydrocarbon group having 12 carbon atoms or more, and titanium elements, and the TVOC thereof is 380 ppm or less.

The polyester resin is produced using a polyvalent carboxylic acid, and at least ethylene glycol as a polyhydric alcohol as raw materials.

<Polyvalent Carboxylic Acid>

Examples of the polyvalent carboxylic acid include a divalent carboxylic acid and a trivalent or higher carboxylic acid.

Examples of the divalent carboxylic acid include terephthalic acid, isophthalic acid, isomers of naphthalene dicarboxylic acid (specifically, 1,4-, 1,5-, 1,6-, 1,7-, 2,5-, 2,6-, 2,7-, 2,8-) and lower alkyl esters thereof; succinic acid, sebacic acid, isodecyl succinic acid, dodecenyl succinic acid, maleic acid, adipic acid, furandicarboxylic acid, and monomethyl, monoethyl, dimethyl, diethyl esters thereof and acid anhydrides thereof; fumaric acid, maleic acid, maleic anhydride, citraconic acid, itaconic acid, tetrahydrophthalic acid and ester derivatives thereof; and acrylic acid, crotonic acid, methacrylic acid, and ester derivatives thereof.

Examples of lower alkyl esters of the terephthalic acid and isophthalic acid include dimethyl terephthalate, dimethyl isophthalate, diethyl terephthalate, diethyl isophthalate, dibutyl terephthalate, and dibutyl isophthalate.

Among these, as the divalent carboxylic acid, the isophthalic acid and the terephthalic acid are preferable in terms of excellent preservability of the toner, handling property and cost; and the isophthalic acid is more preferable in terms of excellent reactivity.

These may be used alone or in combination of two or more thereof.

Furthermore, the below-mentioned trivalent or higher carboxylic acid may be used together.

Examples of the trivalent carboxylic acid include trimellitic acid, pyromellitic acid, 1,2,4-cyclohexane tricarboxylic acid, 2,5,7-naphthalene tricarboxylic acid, 1,2,4-naphthalene tricarboxylic acid, 1,2,5-hexane tricarboxylic acid, 1,2,7,8-octane tetracarboxylic acid, and acid anhydrides or lower alkyl esters thereof.

Among these, as the trivalent or higher carboxylic acid, trimellitic acid, trimellitic anhydride, pyromellitic acid, and pyromellitic anhydride are preferable in terms of excellent handling property and cost.

<Polyhydric Alcohol>

At least the ethylene glycol is used as the polyhydric alcohol. By using the ethylene glycol, the resin can be obtained with high productivity.

On the other hand, the ethylene glycol corresponds to VOC. In a case where only the ethylene glycol is used as the polyhydric alcohol, although the productivity of the polyester resin is excellent, since the polyester resin with high TVOC is easily obtained, it is preferable to use the ethylene glycol in combination with other alcohols.

As preferred polyhydric alcohols used in combination with the ethylene glycol, an alkylene oxide adduct of bisphenol A is exemplified. Since the alkylene oxide adduct of bisphenol A has a high boiling point and does not correspond to VOC, the combined use thereof tends to reduce the TVOC of the polyester resin. On the other hand, the poor reactivity thereof tends to decrease the productivity in resin production. In addition, there is concern that bisphenol A may affect the environmental aspect and the like. Therefore, combined use with other alcohols is preferable.

As the alkylene oxide adduct of bisphenol A, a compound represented by the following General Formula (i) is exemplified.

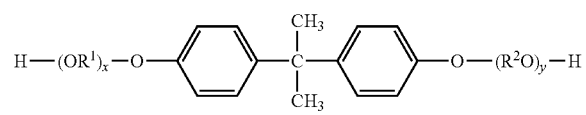
(i)

In Formula (i), each of $OR^1$ and $R^2O$ is alkylene oxide. $R^1$ and $R^2$ are the same or different and each of $R^1$ and $R^2$ is an alkylene group having 2 or 3 carbon atoms.

x and y are numbers indicating the average added mole numbers of alkylene oxide, and both x and y are 1 or more. Further, x+y=2 to 6 is preferable, and 2 and 3 are more preferable.

Specific examples of the compound represented by General Formula (i) include polyoxyethylene-(2.0)-2,2-bis(4-hydroxyphenyl) propane, polyoxyethylene-(2.3)-2,2-bis(4-hydroxyphenyl) propane, polyoxypropylene-(2.0)-2,2-bis(4-hydroxyphenyl) propane, polyoxypropylene-(2.3)-2,2-bis(4-hydroxyphenyl) propane, polyoxypropylene (2.2)-polyoxyethylene-(2.0)-2,2-bis(4-hydroxyphenyl) propane, polyoxypropylene (6)-2,2-bis(4-hydroxyphenyl) propane, polyoxypropylene (2.2)-2,2-bis(4-hydroxyphenyl) propane, polyoxypropylene-(2.4)-2,2-bis(4-hydroxyphenyl) propane, and polyoxypropylene (3.3)-2,2-bis(4-hydroxyphenyl) propane.

These may be used alone or in combination of two or more thereof.

In addition, as the alkylene oxide adduct of bisphenol A, an ethylene oxide adduct of bisphenol A may be used alone, a propylene oxide adduct of bisphenol A may be used alone, or the ethylene oxide adduct of bisphenol A and the propylene oxide adduct of bisphenol A may be used in combination. In addition, in a case where the ethylene oxide adduct of bisphenol A is used alone, it is preferable to use 2 or more kinds of polyvalent carboxylic acid.

Examples of polyhydric alcohol other than ethylene glycol and the alkylene oxide adduct of bisphenol A include divalent aliphatic alcohol such as neopentyl glycol, propylene glycol, hexanediol, polyethylene glycol, 1,3-propanediol, 1,4-butanediol, diethylene glycol, triethylene glycol, 1,4-cyclohexanedimethanol, D-isosorbide, L-isosorbide, isomannide, erythritan, and 1,4-dihydroxy-2-butene; and trivalent or higher aliphatic alcohol such as sorbitol, 1,2,3,6-hexatetralol, 1,4-sorbitan, pentaerythritol, dipentaerythritol, tripentaerythritol, 1,2,4-butanetriol, 1,2,5-pentanetriol, glycerol, 2-methyl-1,2,3-propanetriol, 2-methyl-1,2,4-butanetriol, trimethylolpropane, 1,3,5-trihydroxymethylbenzene, and glycerin.

These may be used alone or in combination of two or more thereof. Among these, trimethylolpropane and neopentyl glycol are preferable.

<Polyester Resin and Compound a Having Hydrocarbon Group Having 12 Carbon Atoms or More>

The polyester resin for toner of the present invention has the hydrocarbon group having 12 carbon atoms or more at the molecular terminal or the like. By having the hydrocarbon group, the compatibility with the wax that is to be blended at the time of toner formation is improved, and the fixability, the offset resistance, and the durability of the toner to be obtained become favorable. Further, the structure derived from the hydrocarbon group having 12 carbon atoms or more is preferably 0.1% to 5 mass % in all the components. In a case where the structure is 0.1 mass % or more, the above effects are exhibited, and in a case where the structure is 5 mass % or less, the reactivity during the resin production and the storage stability of the toner to be obtained tend to be favorable.

In the present description, a compound A has any one of a functional group which reacts with an acid, a functional group which reacts with alcohol, and an ester group, and the hydrocarbon group having 12 carbon atoms or more.

In order to obtain the polyester resin having the hydrocarbon group having 12 carbon atoms or more at the molecular terminal or the like, polyvalent carboxylic acid and polyhydric alcohol may be polycondensed in the presence of the compound (compound A) which has any one of the functional group which reacts with an acid, the functional group which reacts with alcohol, and the ester group, and the hydrocarbon group having 12 carbon atoms or more. The functional group which reacts with the acid or alcohol or the ester group is not particularly limited, but examples thereof include a carboxyl group or an anhydride thereof, a hydroxyl group, a glycidyl group, an alkoxy group, an isocyanate group, and an ester group. Among these, the carboxyl group or the anhydride thereof, the hydroxyl group, and the ester group are preferable, and the carboxyl group, the hydroxyl group, and the ester group are more preferable.

As the compound A, the following substances are exemplified, and can be used alone or in combination of two or more.

Aliphatic carboxylic acid such as myristic acid (having 13 carbon atoms), palmitic acid (having 15 carbon atoms), stearic acid (having 17 carbon atoms), oleic acid (having 17 carbon atoms), and behenic acid (having 21 carbon atoms); aliphatic alcohol such as lauryl alcohol (having 12 carbon atoms), and stearyl alcohol (having 18 carbon atoms); rice wax (one of hydrocarbon groups having about 18 to 34 carbon atoms of fatty acid and fatty alcohol ester), carnauba wax (one of hydrocarbon groups having 16 to 34 carbon atoms), any one of an ester wax of WEP series and the like of NOF CORPORATION, which has the hydrocarbon groups having 12 carbon atoms or more, any of polyethylene where a terminal is modified by an acid of Yunishiddo series and the like of TOYO ADL CORPORATION, which has 12 carbon atoms or more; any of a polyethylene where a terminal is modified by an alcohol of Yuni Rin series and the like of TOYO ADL CORPORATION, which has 12 carbon atoms or more; and any of oxidized polyethylene, EPOLENE E-10J (an oxidation product of polyethylene having 100 carbon atoms or more), and Licowax PED-822, which has 12 carbon atoms or more.

<Method for Producing Polyester Resin>

The polyester resin can be produced using a well-known method for producing the polyester resin. For example, raw materials such as polyvalent carboxylic acid and polyhydric alcohol, and the catalyst are input into a reaction vessel, heating and warming are performed to carry out an esterification reaction or a transesterification reaction, and water or alcohol produced by the reaction is removed. Thereafter, a polycondensation reaction is carried out. At this time, the pressure in the reactor is gradually reduced, and polycondensation is carried out while distilling and removing a diol component under a vacuum of 150 mmHg (20 kPa) or less, preferably 15 mmHg (2 kPa) or less.

As the catalyst used at the time of esterification reaction, transesterification reaction, and polycondensation, it is preferable to use a titanium-based catalyst in terms of easily obtaining the polyester resin with reduced TVOC. Thereby, the polyester resin containing a titanium element can be obtained.

Examples of the titanium-based catalyst include a titanium alkoxide compound having an alkoxy group, titanium carboxylic acid, titanyl carboxylic acid, titanyl carboxylic acid salt, and a titanium chelate compound.

Examples of the titanium alkoxide compound having an alkoxy group include tetramethoxytitanium, tetraethoxytitanium, tetrapropoxytitanium, tetrabutoxytitanium, tetrapentoxytitanium, and tetraoctoxytitanium.

Examples of the titanium carboxylic acid compound include titanium formate, titanium acetate, titanium propionic acid, titanium octane acid, titanium oxalic acid, titanium succinic acid, titanium maleic acid, titanium adipic acid, titanium sebacic acid, hexane tricarboxylic acid titanium, isooctane tricarboxylic acid titanium, octane tetracarboxylic acid titanium, decane tetracarboxylic acid titanium, titanium benzoic acid, titanium phthalic acid, titanium terephthalic acid, titanium isophthalic acid, 1,3-naphthalene dicarboxylic acid titanium, 4,4-biphenyl dicarboxylic acid titanium, titanium 2,5-toluene dicarboxylate, anthracene dicarboxylic acid titanium, titanium trimellitic acid, 2,4,6-naphthalene tricarboxylic acid titanium, pyromellitic acid titanium, and 2,3,4,6-naphthalene tetracarboxylic acid titanium.

Among the titanium-based catalysts, since the titanium-based catalyst, which is liquid at normal temperature, is easily dispersed uniformly in the system at the time of reaction, the reactivity tends to be high and the TVOC tends to be easily reduced. In addition, the titanium-based catalysts which are liquid at normal temperature is also preferable in that the transparency of the resin to be obtained tends to be easily enhanced. Among the titanium-based catalysts, tetrabutoxytitanium is particularly preferable. Further, the titanium-based catalysts may be used alone or in combination of two or more thereof.

In addition, as long as the effects of the present invention are not impaired, organic tin such as dibutyl tin oxide, inorganic tin such as tin oxide and tin 2-ethyl hexanoate, calcium acetate, calcium acetate hydrate, zinc acetate, antimony trioxide, and germanium dioxide may be used in combination.

In the method for producing the polyester resin of the present invention, a monomer mixture is polycondensed, in which polyhydric alcohol including an alkylene oxide adduct of bisphenol A and ethylene glycol, and polyvalent carboxylic acid are mixed at a ratio such that, in the monomer including polyhydric alcohol and polyvalent carboxylic acid, the number of hydroxyl groups is preferably in a range of 0.9 or more and 1.20 or less, more preferably 1.0 or more and 1.20 or less, and still more preferably 1.05 or more and 1.20 or less when the number of carboxyl groups is 1. In the monomer, in a case where the number of carboxyl groups is 1, when the number of hydroxyl groups is 0.9 or more, the resin can be obtained with favorable productivity, and when the number of hydroxyl groups is 1.20 or less, the amount of unreacted ethylene glycol is reduced and TVOC can be reduced. Even in consideration of the physical properties of the resin to be obtained, it is preferable to mix all the acid components and all the alcohol components in the range mentioned above.

Further, in the method for producing the polyester resin for toner according to the present invention, the monomer mixture which includes polyvalent carboxylic acid and polyhydric alcohol is polycondensed in the presence of the compound A. By polycondensing the monomer mixture including polyvalent carboxylic acid and polyhydric alcohol in the presence of the compound A, it is possible to obtain the polyester resin having the hydrocarbon group at the molecular terminal and to improve compatibility with the wax that is to blended at the time of toner formation.

The additional amount of the compound A is preferably 0.1 mass % or more and less than 3 mass %, and more preferably 0.5 mass % or more and 2.5 mass % or less in all the constituent components. In a case where the additional amount is 0.1 mass % or more, the above effects are exhibited, and in a case where the additional amount is less than 3 mass %, the reactivity during the resin production and the storage stability of the toner to be obtained tend to be favorable, and the TVOC amount tends to be reduced.

Specific examples of the functional group which reacts with the acid or the alcohol, or the ester group, and specific examples of the compound A are as described above.

In the polyester resin for toner according to the present invention, the compound which includes the hydrocarbon group having 12 carbon atoms or more, and the functional group that reacts with the acid or the alcohol or the ester group is preferably 0.1 mass % or more and less than 3 mass %, and is more preferably 0.5 mass or more and 2.5 mass % or less in the mixture.

In the method for producing the polyester resin for toner according to the present invention, the polycondensation reaction is performed in the presence of the titanium-based catalyst, preferably with the amount of the alkylene oxide adduct of bisphenol A being 0.1 parts by moles or more and 45 parts by moles or less, and more preferably with the amount of the alkylene oxide adduct of bisphenol A being 5 parts by moles or more and 45 parts by moles or less, with respect to 100 parts by moles of the acid component.

By performing the polycondensation reaction in the presence of the titanium-based catalyst with the amount being 0.1 parts by moles or more and 45 parts by moles or less, the productivity tends to be high and the TVOC tends to be easily reduced.

In the polyester resin for toner according to the present invention, the polyester resin for toner is obtained by reaction in the presence of the titanium-based catalyst, and the constitutional unit derived from the alkylene oxide adduct of bisphenol A is preferably 0.1 parts by moles or more and 45 parts by moles or less, and more preferably 5 parts by moles or more and 45 parts by moles or less, with respect to 100 parts by moles of the acid component.

In the method for producing the polyester resin for toner according to the present invention, the alkylene oxide adduct of bisphenol A is preferably 0.1 parts by moles or more and 30 parts by moles or less, and more preferably 5 parts by moles or more and 30 parts by moles or less, with respect to 100 parts by moles of the acid component. Also, terephthalic acid is preferably 70 parts by moles or less.

When the alkylene oxide adduct of bisphenol A is 30 parts by moles or less with respect to 100 parts by moles of the acid component, the productivity tends to be improved and the influence on the environment tends to be improved, and when the terephthalic acid is 70 parts by moles or less, the TVOC tends to be easily reduced.

In the polyester resin for toner according to the present invention, with respect to 100 parts by moles of the acid component, the constitutional unit derived from the alkylene oxide adduct of bisphenol A is preferably 0.1 parts by moles or more and 30 parts by moles or less, and more preferably 5 parts by moles or more and 30 parts by moles or less, and a constitutional unit derived from terephthalic acid is preferably 70 parts by moles or less.

In a case where the alkylene oxide adduct of bisphenol A is 30 parts by moles or less with respect to 100 parts by moles of the acid component, the resin of which the productivity is favorable and in which the environmental aspect is also taken into consideration is obtained. Further, in a case where the terephthalic acid is 70 parts by moles or less, the polyester resin for toner with reduced TVOC is obtained.

In the method for producing the polyester resin for toner according to the present invention, a ratio of the number of hydroxyl groups derived from the alcohol component to the number of carboxyl groups derived from the acid component (hydroxyl group/carboxyl group) is 0.90 or more and 1.09 or less, and the alkylene oxide adduct of bisphenol A is 0.1 parts by moles or more and 45 parts by moles or less with respect to 100 parts by moles of the acid component.

The ratio of the number of hydroxyl groups derived from the alcohol component to the number of carboxyl groups derived from the acid component (hydroxyl group/carboxyl group) is preferably 1.00 or more and 1.09 or less.

When the ratio of the number of hydroxyl groups derived from the alcohol component to the number of carboxyl groups derived from the acid component (hydroxyl group/carboxyl group) is preferably 0.90 or more and 1.09 or less, the TVOC tends to be easily reduced.

When the alkylene oxide adduct of bisphenol A is 0.1 parts by moles or more and 45 parts by moles or less with respect to 100 parts by moles of the acid component, the productivity tends to become favorable and the influence on the environment tends to be improved.

The polyester resin for toner according to the present invention is a polycondensate of the monomer mixture in which the ratio of the number of hydroxyl groups derived from the alcohol component to the number of carboxyl groups derived from the acid component (hydroxyl group/carboxyl group) is preferably 0.90 or more and 1.09 or less, and more preferably 1.00 or more and 1.09 or less, the constitutional unit derived from the alkylene oxide adduct of bisphenol A is preferably 0.1 parts by moles or more and 45 parts by moles or less with respect to 100 parts by moles of the acid component.

The polyester resin for toner according to the present invention is obtained by reacting a mixture of a monomer including an acid component and an alcohol component which is 90 parts by moles or more and 150 parts by moles or less with respect to 100 parts by moles of the acid component, and a compound which includes a hydrocarbon group having 12 carbon atoms or more, and a functional group that reacts with an acid or alcohol or an ester group. The alkylene oxide adduct of bisphenol A and ethylene glycol are included as the alcohol component, and the total amount of volatile organic compound (TVOC) is 380 ppm or less.

A monomer including an acid component and an alcohol component which is 100 parts by moles or more and 140 parts by moles or less with respect to 100 parts by moles of the acid component is more preferable. By having a monomer including an acid component and an alcohol component which is 90 parts by moles or more and 150 parts by moles or less with respect to 100 parts by moles of the acid component, the productivity tends to be improved and the TVOC tends to be easily reduced.

The polymerization temperature of the esterification reaction, the transesterification reaction, and the polycondensation reaction is preferably 180° C. to 280° C. When the polymerization temperature is 180° C. or higher, the productivity tends to be favorable. When the polymerization temperature is 280° C. or lower, decomposition of the polyester resin or by-product of volatile component causing odor tends to be suppressed, and TVOC is further reduced. The lower limit value of the polymerization temperature is more preferably 200° C. or higher, and the upper limit value is more preferably 270° C. or lower.

Further, as the time for a polycondensation step (the sum of the polycondensation reaction time and the extraction time) is shorter, the decomposition of the polyester resin or the by-product of the volatile component causing odor tends to be suppressed.

<Physical Properties of Polyester Resin>

The TVOC of the polyester resin is 380 ppm or less, preferably 330 ppm or less, and more preferably 300 ppm or less. The binder resin such as a polyester resin is usually contained in toner in an amount of about 90 mass % or less. When the TVOC of the polyester resin is 380 ppm or less, the TVOC of the toner containing the polyester resin is approximately 300 ppm or less. Therefore, toner with sufficiently reduced TVOC is obtained.

The TVOC of the polyester resin can be measured using a gas chromatograph-mass spectrometer (GC-MS).

A glass transition temperature (Tg) of the polyester resin is preferably 40° C. to 85° C., and more preferably 45° C. to 75° C. When the glass transition temperature is 40° C. or more, the storage stability of the toner is improved, and when the glass transition temperature is 85° C. or less, the low-temperature fixability of the toner becomes more excellent.

The glass transition temperature of the polyester resin is determined as follows. That is, by using a differential scanning calorimeter, the temperature of an intersection of a baseline on the low temperature side of the chart when measured at a heating rate of 5° C./min and a tangent of an endothermic curve in the vicinity of the glass transition temperature is obtained, and the obtained temperature is set as Tg.

The softening temperature (T4) of the polyester resin is preferably 80° C. to 170° C., and more preferably 85° C. to 160° C. When the softening temperature is 80° C. or higher, a hot-offset resistance becomes favorable. On the other hand, when the softening temperature is 170° C. or less, the low-temperature fixability becomes favorable.

The softening temperature of the polyester resin can be measured using a flow tester.

The acid value of the polyester resin is preferably 0.1 to 60 mg KOH/g, more preferably 0.1 to 50 mg KOH/g, and still more preferably 1 mg KOH/g or more and less than 30 mg KOH/g. When the acid value is 0.1 mg KOH/g or more, the productivity of the polyester resin tends to be further improved. When the acid value is 60 mg KOH/g or less, the humidity resistance of the polyester resin is improved and thus, toner is less likely to be affected by the use environment.

The acid value of the polyester resin refers to the amount of potassium hydroxide required to neutralize the carboxyl group per 1 g of sample in milligrams, and is expressed in units of mg KOH/g.

Further, the ratio between the acid value and the hydroxyl value of the polyester resin is preferable that the hydroxyl value is in a range of 0.8 to 30 with respect to the acid value of 1. The ratio between the acid value and the hydroxyl value of the polyester resin largely depends on the ratio between the carboxyl group and the hydroxyl group in the total raw materials or on the degree of polymerization, and can be within the desired range by appropriately adjusting the ratio between the carboxyl group and the hydroxyl group and the degree of polymerization. The hydroxyl value is more preferably 1 or more and 20 or less with respect to the acid value of 1.

The hydroxyl value of the polyester resin refers to the amount of potassium hydroxide required to neutralize carboxyl group for neutralizing the hydroxyl group per 1 g of sample in milligrams, and is expressed in units of mg KOH/g.

The polyester resin of the present invention is produced using ethylene glycol as a monomer component (polyhydric alcohol) and a titanium catalyst so as to have a TVOC of 380 ppm or less. Accordingly, the polyester resin of the present invention has sufficiently decreased TVOC.

Moreover, in the case of the polyester resin of the present invention, it is unnecessary to prolong decompression reaction time during the resin production to remove residual monomers. In addition, since ethylene glycol having high reactivity is used, the productivity of the polyester resin is high.

Furthermore, since a hydrocarbon skeleton having 12 carbon atoms or more is provided at the molecular terminal or the like, the dispersibility of the wax that is to be added at the time of toner formation can be enhanced.

The polyester resin of the present invention is suitable as a binder resin for toner, and therefore, it is possible to obtain toner with sufficiently reduced TVOC and favorable wax dispersibility by using the polyester resin of the present invention.

<Toner>

The toner of the present invention contains the above-described polyester resin for toner of the present invention.

The content of the polyester resin of the present invention is preferably 5 to 90 mass % in 100 mass % of the toner.

Further, the toner of the present invention may contain a formulation of a colorant, a charge control agent, a release agent, a flow modifier, a magnetic body, and a resin other than the polyester resin of the present invention (other kinds of binder resin) as necessary.

Examples of the colorant include carbon black, nigrosine, aniline blue, phthalocyanine blue, phthalocyanine green, Hansa yellow, rhodamine dyes and pigments, chrome yellow, quinacridone, benzidine yellow, rose bengal, triallyl methane dyes, and monoazo type, disazo type, and condensed azo type dyes or pigments. These may be used alone or in combination of two or more thereof.

In a case where toner is used as color toner, examples of a yellow colorant include benzidine yellow, monoazo dyes and pigments, and condensed azo dyes and pigments; examples of a magenta colorant include quinacridone, rhodamine dyes and pigments, and monoazo dyes and pigments; and an example of a cyan colorant includes phthalocyanine blue.

The content of the colorant is not particularly limited, but is preferably 2 to 10 mass % in 100 mass % of the toner, from the viewpoints of excellent color tone, image density, and heat characteristics of the toner.

Examples of the charge control agent include positive charge type charge control agents such as quaternary ammonium salt or a basic or electron-donating organic substance; and negative charge type charge control agents such as metal chelate, metal-containing dyes, and acidic or electron-withdrawing organic substances.

In a case of using toner as color toner, a charge control agent which is colorless or light color and has little color tone hindrance to toner is suitable. Examples of such a charge control agent include chromium salicylate or chromium alkyl salicylate, zinc, metal salts with aluminum and the like, metal complexes, amide compounds, phenol compounds, and naphthol compounds. Furthermore, styrene type, acrylic acid type, methacrylic acid type, and vinyl polymers having a sulfonic acid group may be used as the charge control agent.

The content of the charge control agent is preferably 0.5 to 5 mass % in 100 mass % of the toner. When the content of the charge control agent is 0.5 mass % or more, the charge amount of the toner tends to be a sufficient level. When the content of the charge control agent is 5 mass % or less, the decrease in the charge amount due to aggregation of the charge control agent tends to be suppressed.

In consideration of releasability, preservability, fixability, color developability, and the like of the toner, carnauba wax, rice wax, beeswax, polypropylene wax, polyethylene wax, synthetic ester wax, paraffin wax, fatty acid amide, silicone wax, and the like can be appropriately selected and used as a release agent. These may be used alone or in combination of two or more thereof.

The melting point of the release agent may be appropriately determined in consideration of the above-described toner performance.

The content of the release agent is not particularly limited, but is preferably 0.3 to 15 mass % in 100 mass % of the toner since the content of the release agent affects the toner performance. The lower limit value of the content of the release agent is more preferably 1 mass % or more, and particularly preferably 2 mass % or more. Moreover, the upper limit value of the content of the release agent is more preferably 13 mass % or less, and particularly preferably 12 mass % or less.

Examples of additives such as flow modifiers include fine powder fluidity improvers such as silica, alumina, and titania; inorganic fine powders such as magnetite, ferrite, cerium oxide, strontium titanate, and conductive titania; resistance regulators such as styrene resins and acrylic resins; and lubricants. These additives are used as internal additives or external additives.

The content of the additives is preferably 0.05 to 10 mass % in 100 mass % of the toner. When the content of the additives is 0.05 mass % or more, the effect of improving the performance of the toner tends to be sufficiently obtained. When the content of the additives is 10 mass % or less, the image stability of the toner tends to become favorable.

Other binder resins include, for example, a polyester resin (except the polyester resin of the present invention), a styrene resin, a cyclic olefin resin, and an epoxy resin. These may be used alone or in combination of two or more thereof.

The toner of the present invention can be used as any one of a magnetic one-component developer, a nonmagnetic one-component developer, and a two-component developer.

In a case where the toner of the present invention is used as a magnetic one-component developer, the toner contains a magnetic body. Examples of the magnetic body include ferromagnetic alloy including, for example, ferrite, magnetite, iron, cobalt, and nickel; and alloy (for example, Heusler alloy, such as manganese-copper-aluminum and manganese-copper-tin, which contains manganese and copper, and chromium dioxide) which does not contain compounds or ferromagnetic elements but exhibits ferromagnetism through suitable heat treatment.

The content of the magnetic body is not particularly limited, but is preferably 3 to 70 mass % in 100 mass of the toner since the content of the magnetic body greatly affects the crushability of the toner. When the content of the magnetic body is 3 mass % or more, the charge amount of the toner tends to be a sufficient level. When the content of the magnetic body is 70 mass % or less, fixability or crushability of the toner tends to be favorable. The upper limit value of the content of the magnetic body is more preferably 60 mass % or less, and particularly preferably 50 mass % or less.

In a case where the toner of the present invention is used as a two-component developer, the toner of the present invention is used in combination with a carrier.

Examples of the carrier include magnetic substances such as iron powder, magnetite powder, and ferrite powder, those obtained by applying a resin coating on the surface thereof, and magnetic carriers. Examples of the coating resin for the resin-coated carriers include a styrene resin, an acrylic resin, a styrene-acryl copolymeric resin, a silicone resin, a modified silicone resin, a fluorine resin, and a mixture of these kinds of resins.

The amount of carrier used is preferably 500 to 3000 parts by mass with respect to 100 parts by mass of the toner. When the amount of carrier used is 500 parts by mass or more, fogging or the like tends to become difficult to occur. When the amount of carrier used is 3,000 parts by mass or less, the density of a fixed image tends to be sufficiently high.

The method for producing the toner of the present invention is not particularly limited, but examples thereof include a production method of mixing the polyester resin of the present invention with the above-mentioned formulation, melting and kneading the mixture with a twin-screw extruder or the like, performing coarse grinding, fine grinding, and classification, and performing an external addition treatment or the like on inorganic particles as needed (grinding method); a production method of dissolving and dispersing the polyester resin of the present invention and a formulation in a solvent, removing the solvent followed by granulation in an aqueous medium, performing washing and drying to obtain toner particles, and performing an external addition treatment on inorganic particles as needed; and a production method of emulsifying the polyester resin of the present invention in water, granulating through aggregation and fusion with an atomized formulation in water, performing washing and drying to obtain toner particles, and optionally performing an external addition treatment on inorganic particles as needed (chemical method).

The average particle size of the toner of the present invention is not particularly limited, but is preferably 3 to 15 μm, and more preferably 5 to 10 μm. When the average particle size of the toner is 3 μm or more, the productivity tends to be favorable, and the problem of pneumoconiosis tends to become difficult to occur. On the other hand, when the average particle size of the toner is 15 μm or less, a high quality image tends to be stably formed.

Since the toner of the present invention contains the above-mentioned polyester resin of the present invention, the TVOC is sufficiently reduced.

EXAMPLES

Hereinafter, the present invention will be specifically described by way of examples. However, the present invention is not limited to the following examples.

The evaluation method of a polyester resin shown in the example is as follows.

[Measurement and Evaluation]

<Measurement of Glass Transition Temperature (Tg)>

The glass transition temperature of the polyester resin was measured from an intersection of a baseline of a chart at a heating rate of 5° C./min and a tangent of an endothermic curve, by using a differential scanning calorimeter ("DSC-60" manufactured by Shimadzu Corporation). A sample which is obtained by weighing 10 mg±0.5 mg of a measurement sample into an aluminum pan, melting the weighed measurement sample at 100° C. which is equal to or higher than the glass transition temperature for 10 minutes, and then, subjecting the melted measurement sample to a rapid cooling treatment using dry ice.

<Measurement of Softening Temperature (T4)>

Regarding the softening temperature of polyester resin, the temperature when ½ amount out of 1.0 g of a resin sample was flowed out was measured by using a flow tester ("CFT-500D" manufactured by Shimadzu Corporation) under a load of 294 N and a constant temperature rise at a heating rate of 3° C./min with a 1 mmφ×10 mm nozzle, and the measured temperature was set as a softening temperature.

<Measurement of Acid Value>

The acid value of the polyester resin was measured as follows.

Approximately 0.2 g of a measurement sample was precisely weighed in a branched Erlenmeyer flask (a (g)), 20 mL of benzyl alcohol was added, and the measurement sample was dissolved by being heated at 230° C. for 15 minutes with a heater under a nitrogen atmosphere. After cooling to room temperature, 20 mL of chloroform and a few drops of cresol red solution were added, and the solution was titrated with a 0.02 N KOH solution (titration amount=b (mL), KOH solution titer=p). A blank measurement was performed in the same manner (titration amount=c (mL)), and the acid value was calculated according to the following formula.

$$\text{Acid value (mg KOH/g)} = \{(b-c) \times 0.02 \times 56.11 \times p\}/a$$

<Measurement of Hydroxyl Value>

The hydroxyl value of the polyester resin was measured based on JIS K 0070-1992.

<Measurement of TVOC>

The TVOC of the polyester resin was measured as follows.

Approximately 10 mg (equal to or greater than 9.9 mg and less than 10.1 mg) of a measurement sample was precisely weighed, and volatile components were extracted from the measurement sample by heating the volatile components at 130° C. for 10 minutes in a thermal desorption device, and were then trapped (concentrated) using a cooling module. Subsequently, the resultant was heated rapidly, and was subjected to GC-MS to quantify TVOC. The measurement device, the measurement conditions, and the quantitative determination method are as follows.

(Measurement Device)

Thermal desorption device: "THERMAL DESORPTION INTRODUCTION SYSTEM TDS A/TDS 2/CIS 4" manufactured by GERSTEL GmbH & Co.

GC-MS: "GC/MS 6890N/5975" manufactured by Agilent Technologies (Thermal Desorption Conditions)

Sample-heating temperature: 50° C. (0.5 min)→50° C./min→130° C. (10 min)

Cryo-focus and rapid heating condition: −30° C. (0.5 min)→12° C./sec→130° C. (10 min)

Interface: 130° C.

Carrier gas: Helium

Desorption Mode: Splitless (GC Conditions)

Column: "UA-5 (30 min×0.25 mm I.D. film thickness of 0.25 μm)" manufactured by Frontier Laboratories Ltd.

Column temperature: 35° C. (3 min)→10° C./min→330° C. (7 min)

Carrier gas: Helium (flow rate of 1.0 ml/min)

Injection port mode: Solvent vent (vent flow rate of 50 ml/min, split vent line flow rate of 30 min/min @ 0.02 min)

Transfer line temperature: 280° C.

(MS Conditions)

Ionization method: EI

Ionization voltage: 70 V

Ionization current: 300 μA

Scan range: 29 to 550 amu (Quantitative Determination Method of TVOC)

Regarding components detected during a peak elution time of n-hexane and n-hexadecane in an obtained chromatogram, a sum of peak areas of the components excluding ethylene glycol (EG) was calculated as a toluene-converted concentration from measurement results (peak areas) of a previously prepared toluene solution (1,000 ppm, an injection amount of 1 μl under the above-described GC and MS conditions).

Regarding EG, the peak area of EG was calculated as an EG concentration from the measurement result (peak area) of a previously prepared EG solution (1,000 ppm, injection amount of 1 μl under the above-described GC and MS conditions).

A value of a sum of the concentration of EG and the concentration of the sum of the areas of the components excluding EG was set as TVOC.

<Wax Dispersibility>

The wax dispersibility was evaluated as follows.

After 95 parts of resin and 5 parts of polyethylene wax of which melting point is 84° C. were mixed by dry blending, the mixture was kneaded by a twin-screw extruder (PCM-29 manufactured by Ikegai Corp.) to obtain a plate-like sample. The small pieces of the sample were heat pressed with a press set at the softening temperature of the resin to form a thin film, and observed with a microscope.

Microscopic observation of the thin film was carried out in a 3 cm square field of view, and the wax dispersibility was evaluated based on the following criteria.

A: Wax having a particle size of 3 μm or more is not observed in an arbitrary 100 μm square range.

B: Wax having a particle size of 3 μm or more is observed in an arbitrary 100 μm square range.

Examples 1 to 5 and Comparative Examples 1 and 2

The polyvalent carboxylic acid, the polyhydric alcohol, a substance containing the hydrocarbon group having 12 carbon atoms or more and the functional group which reacts with an acid or a hydroxyl group at the terminal thereof, and a catalyst according to the mixing composition shown in Table 1 were into the reaction vessel of a distillation column. In addition, the quantity of the catalyst is a quantity (ppm) with respect to the total raw materials.

Subsequently, the rotational speed of the stirring blade in the reaction vessel was maintained at 120 rpm, temperature raising was started, heating was performed so that the temperature in the reaction system became 265° C., and this temperature was maintained to carry out esterification reaction. After no distillation of water is left from the reaction system and thereby the esterification reaction is completed, the temperature in the reaction system is lowered and maintained at 240° C., the pressure in the reaction vessel is reduced over about 40 minutes, and the degree of vacuum is 133 Pa. The polycondensation reaction was carried out while distilling off the polyhydric alcohol from the reaction system.

The viscosity of the reaction system increased with the reaction, and the degree of vacuum increased with the increase of the viscosity, and the condensation reaction was carried out until the torque of the stirring blade reached a value indicating the desired softening temperature. Then, the stirring was stopped at the time when the predetermined torque is shown, the reaction system was returned to normal pressure, and reactant was extracted (ejected) from the reaction vessel through pressurizing the system with nitrogen to obtain the polyester resin.

Measurement of physical properties (glass transition temperature, softening temperature, acid value) of the obtained polyester resin and resin evaluation (TVOC, wax dispersibility) were carried out. The results are shown in Table 1.

TABLE 1

| | | | Example 1 | Example 2 | Example 3 | Example 4 | Example 5 | Comparative Example 1 | Comparative Example 2 |
|---|---|---|---|---|---|---|---|---|---|
| Mixing composition | Acid component (parts by moles) | Terephthalic acid | 100 | 60 | 86 | 83 | 100 | 100 | 81 |
| | | Isophthalic acid | | 39 | | 1 | | | 1 |
| | | Trimellitic anhydride | | 1 | 14 | 14 | | | 18 |
| | | Adipic acid | | | | 2 | | | |
| | Alcohol component (parts by moles) | Diol A | 25 | 10 | 35 | 50 | 25 | 25 | 60 |
| | | Diol B | | 1 | | 5 | | | 10 |
| | | Ethylene glycol | 69 | 99 | 80 | 70 | 69 | 70 | 63 |
| | | Trimethylolpropane | 14 | | | | 14 | 14 | |

TABLE 1-continued

|  |  | Example 1 | Example 2 | Example 3 | Example 4 | Example 5 | Comparative Example 1 | Comparative Example 2 |
|---|---|---|---|---|---|---|---|---|
| Hydrocarbon group having 12 or more carbon atoms + Compound containing functional group | Substance | EPOLENE E-10J | EPOLENE E-10J | EPOLENE E-10J | Rice wax | EPOLENE E-10J | — | EPOLENE E-10J |
|  | Additional amount (wt %) | 1.9 | 1.9 | 1.9 | 1.9 | 3.2 | — | 1.9 |
| Catalyst (ppm) | $Sb_2O_3$ |  | 500 | 500 |  |  |  | 2000 |
|  | Tetrabutoxy-titanium | 500 |  |  | 400 | 500 | 500 |  |
| Mole ratio of (alcohol component/acid component) |  | 1.08 | 1.10 | 1.15 | 1.25 | 1.08 | 1.09 | 1.33 |
| Ratio of (the number of hydroxyl group/the number of carboxyl group) |  | 1.15 | 1.09 | 1.07 | 1.17 | 1.15 | 1.16 | 1.22 |
| Physical properties of the resin | Tg (° C.) | 60.5 | 51.4 | 66 | 55.7 | 60.1 | 60.3 | 62.9 |
|  | T4 (° C.) | 142 | 102 | 172 | 137 | 140 | 139 | 142 |
|  | AV (mgKOH/g) | 8.7 | 12.5 | 17 | 6.3 | 8.8 | 9 | 9.3 |
| Resin evaluation | Amount of TVOC (ppm) | 330 | 115 | 182 | 230 | 369 | 312 | 520 |
|  | Wax dispersibility | A | A | A | A | A | B | A |

The abbreviations in Table 1 are as follows.
Diol A: Propylene oxide derivative of bisphenol A (PO 2.3 mole adduct)
Diol B: Ethylene oxide derivative of bisphenol A (EO 2.3 mole adduct)
Epolen E-10J: Oxidized PE wax manufactured by Westlake Chemical Corporation The polyester resins of Examples 1 to 5 had low TVOC and favorable wax dispersibility.

With the comparison of Examples 1 and 5 with Comparative Example 1, it is confirmed that the wax dispersibility of the polyester resin obtained by polymerizing in the presence of the compound, which includes the hydrocarbon group having 12 carbon atoms or more, and the functional group which reacts with a carboxyl group or hydroxyl group at the terminal or the ester group, is improved.

With the comparison of Examples 1 and 4 with Comparative Example 1, it is confirmed that the use of the titanium-based catalyst at the time of polymerization reduces the amount of TVOC of the obtained resin.

In Comparative Example 2, since the alcohol ratio is high and the alcohol component tends to be excessive, the amount of TVOC increases.

INDUSTRIAL APPLICABILITY

According to the present invention, there are provided a polyester resin for toner which has sufficiently reduced TVOC and has high productivity, and in which an environmental aspect is taken into consideration, and toner which contains the polyester resin for toner and has favorable fixing performance, non-offset property, image stability, and durability.

The invention claimed is:

1. A method for producing a polyester resin for a toner, the method comprising:
polycondensing a monomer mixture comprising a polyhydric alcohol which comprises an alkylene oxide adduct of bisphenol A and ethylene glycol, and a polyvalent carboxylic acid in the presence of a compound A,
wherein the compound A is at least one compound selected from the group consisting of an ester wax comprising at least one hydrocarbon group having at least 12 carbon atoms and an oxidized polyethylene having at least 12 carbon atoms, and
wherein an amount of the polyvalent carboxylic acid and the polyhydric alcohol is set such that the number of hydroxyl groups in a monomer is 1.20 or less when the number of carboxyl groups in the monomer is 1.

2. The method according to claim 1, wherein an amount of the compound A is from 0.1 mass % to less than 3 mass % in total raw materials.

3. The method according to claim 1, wherein a polycondensation reaction is performed in the presence of a titanium-based catalyst, and wherein an amount of the alkylene oxide adduct of bisphenol A is 45 parts by moles or less with respect to 100 parts by moles of an acid component.

4. The method for producing a polyester resin for toner according to claim 1, wherein an amount of the alkylene oxide adduct of bisphenol A is 30 parts by moles or less and an amount of terephthalic acid is 70 parts by moles or less, with respect to 100 parts by moles of an acid component.

5. The method according to claim 1,
wherein a ratio of the number of hydroxyl groups derived from an alcohol component to the number of carboxyl groups derived from an acid component, hydroxyl group/carboxyl group, is 1.09 or less, and
wherein an amount of the alkylene oxide adduct of bisphenol A is 45 parts by mole or less with respect to 100 parts by mole of the acid component.

6. The method according to claim 1, further comprising:
adding the compound A to a reaction vessel before polycondensing the monomer mixture.

7. A polyester resin for toner, obtained by reacting a mixture of:
a monomer including comprising an acid component and from 90 parts by mole to 150 parts by mole of an alcohol component with respect to 100 parts by mole of the acid component; and
a compound A,
wherein the compound A is at least one compound selected from the group consisting of an ester wax comprising at least one hydrocarbon group having at least 12 carbon atoms and an oxidized polyethylene having at least 12 carbon atoms,
wherein an alkylene oxide adduct of bisphenol A and ethylene glycol are included as the alcohol component, and
wherein the total amount of a volatile organic compound (TVOC) is 380 ppm or less.

8. The polyester resin for toner according to claim 7, wherein an amount of the compound A is from 0.1 mass % to less than 3 mass % in the mixture.

9. The polyester resin for toner according to claim 7,
wherein the polyester resin is obtained in the presence of a titanium-based catalyst, and
wherein an amount of a unit derived from the alkylene oxide adduct of bisphenol A is 45 parts by mole or less, with respect to 100 parts by mole of the acid component.

10. The polyester resin for toner according to claim 7, wherein an amount of the unit derived from the alkylene oxide adduct of bisphenol A is 30 parts by mole or less, and an amount of a unit derived from terephthalic acid is 70 parts by mole or less, with respect to 100 parts by mole of the acid component.

11. The polyester resin for toner according to claim 7,
wherein the polyester resin is a polycondensate of a monomer mixture, wherein a ratio of the number of hydroxyl groups derived from the alcohol component to the number of carboxyl groups derived from the acid component hydroxyl group/carboxyl group, is 1.09 or less, and
wherein an amount of a unit derived from the alkylene oxide adduct of bisphenol A is 45 parts by mole or less, with respect to 100 parts by mole of the acid component.

12. A toner comprising the polyester resin of claim 7.

* * * * *